(12) United States Patent
Sattler et al.

(10) Patent No.: US 7,853,562 B2
(45) Date of Patent: Dec. 14, 2010

(54) SYSTEM AND METHOD FOR OBTAINING INFORMATION FROM A DATA MANAGEMENT SYSTEM

(75) Inventors: Juergen Sattler, Wiesloch (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 341 days.

(21) Appl. No.: 11/124,258

(22) Filed: May 9, 2005

(65) Prior Publication Data

US 2006/0095415 A1    May 4, 2006

Related U.S. Application Data

(60) Provisional application No. 60/623,873, filed on Nov. 2, 2004, provisional application No. 60/623,871, filed on Nov. 2, 2004.

(51) Int. Cl.
*G06F 17/00* (2006.01)
*G06F 15/16* (2006.01)

(52) U.S. Cl. .............. 707/613; 707/654; 707/687; 709/227; 709/230; 711/161

(58) Field of Classification Search .......... 707/1, 707/100, 104, 613, 609, 687, 654; 709/227–237, 709/248; 711/611, 162
See application file for complete search history.

(56) References Cited

U.S. PATENT DOCUMENTS

| | | | | |
|---|---|---|---|---|
| 6,209,026 B1 * | 3/2001 | Ran et al. | ................... | 709/218 |
| 6,654,746 B1 * | 11/2003 | Wong et al. | .......................... | 1/1 |
| 6,996,583 B2 * | 2/2006 | Wilmot | ............................... | 1/1 |
| 7,210,996 B2 * | 5/2007 | Rehm et al | ..................... | 463/9 |
| 7,221,800 B2 * | 5/2007 | Sesek et al. | .................. | 382/229 |
| 2002/0049610 A1 * | 4/2002 | Gropper | ......................... | 705/1 |
| 2002/0087576 A1 * | 7/2002 | Geiger et al. | ............. | 707/104.1 |
| 2003/0065642 A1 * | 4/2003 | Zee | ................................ | 707/1 |
| 2003/0200207 A1 * | 10/2003 | Dickinson | ....................... | 707/3 |
| 2004/0003009 A1 * | 1/2004 | Wilmot | ...................... | 707/201 |
| 2004/0249934 A1 * | 12/2004 | Anderson et al. | ........... | 709/224 |
| 2005/0080796 A1 * | 4/2005 | Midgley | ..................... | 707/100 |
| 2005/0192816 A1 * | 9/2005 | Wechsel | ......................... | 705/1 |
| 2006/0015529 A1 * | 1/2006 | Yagawa | .................. | 707/104.1 |

\* cited by examiner

*Primary Examiner*—Greta L Robinson
*Assistant Examiner*—Dennis Truong
(74) *Attorney, Agent, or Firm*—Kenyon & Kenyon LLP

(57) ABSTRACT

A system and method are provided for obtaining information from a data management system. The data management system may determine whether an event occurs triggering the update of this information and, if so, the updated information may then be read from a data object and transmitted from the data management system to the user without an online connection being established between the user and the data management system. In some embodiments, a request may be received from a user of a groupware application program subscribing to updates of identified information and, if the user later performs an action in the groupware application that triggers a request for an update of the identified information, a request for an update of the identified information may be transmitted from the groupware application to a data management system.

13 Claims, 6 Drawing Sheets

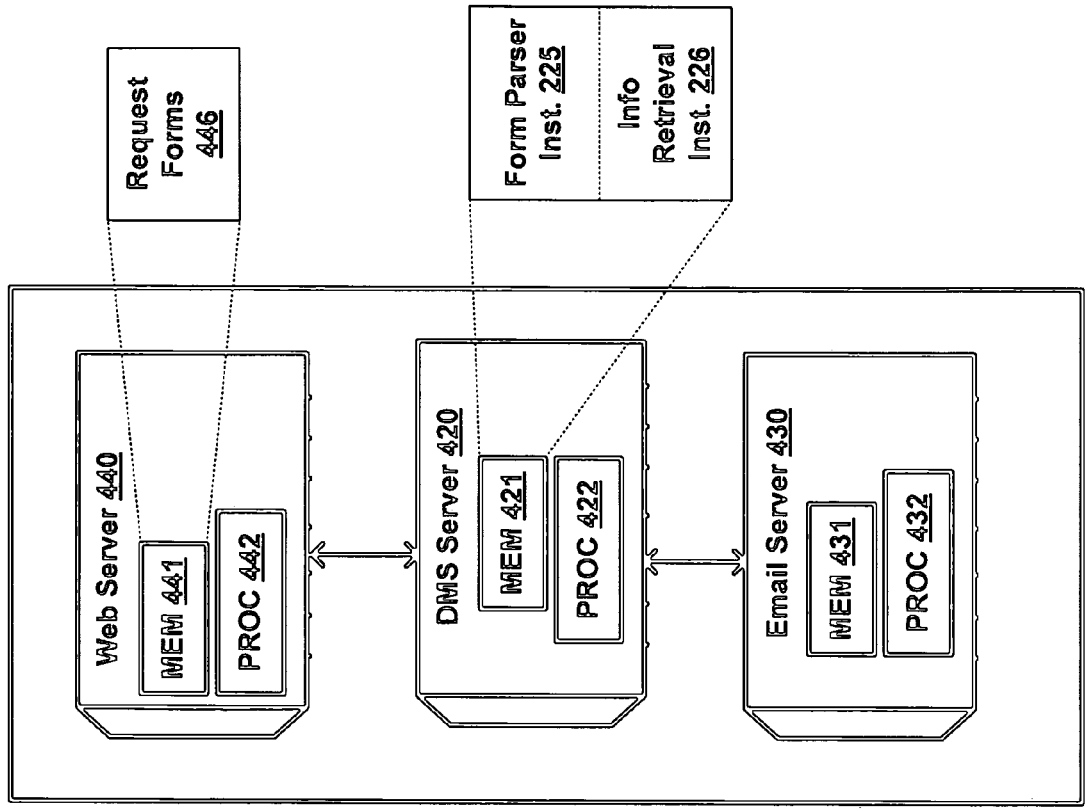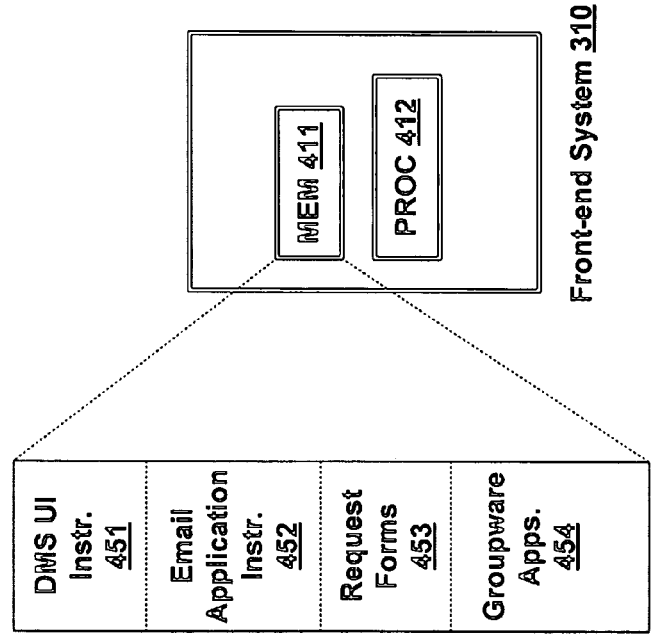
FIG. 4

Response to Info Request
122

From: InfoRequest@BackEndSystem.com
To: Requestor@FrontEndSystem.com

The information that you requested is:

Customer Name: XYZ Travel Inc.

Customer Address: 101 1st St.
Akron Ohio, 22222

Our rep: John Smith
Contact at Partner: Jane Doe
Phone #: 321-000-9089
Correspondence History:
...

Information Request
121

From: Ed Q. Jones
Password: xxx

[X] Customer Information
    Customer ID: XYZ Travel Inc.

[ ] Order Information
    Order ID: ____

[ ] Quotation Information
    Quotation ID: ____

[ ] Activities Information
    Activity ID: ____

FIELDS
169

Form ID # 170

FIG. 5

SYSTEM AND METHOD FOR OBTAINING INFORMATION FROM A DATA MANAGEMENT SYSTEM

CROSS-REFERENCE TO RELATED APPLICATIONS

This application claims the benefit for purposes of priority to U.S. application Ser. No. 60/623,873 (filed Nov. 2, 2004) and to U.S. application Ser. No. 60/623,871 (filed Nov. 2, 2004).

BACKGROUND

The present invention relates generally to obtaining information from a data management system ("DMS"), which as used herein is a computer system that maintains a database of business related information that can be accessed by users of the system. An example of a data management system is a customer relationship management ("CRM") system, which is a system that manages business interactions between an organization and its customers and partners. For example, a CRM system may allow a company to manage sales or service related interactions with its customers. Examples of CRM software are SAP Business One® and Oracle CRM®. Other examples of a data management system are a supplier relationship management ("SRM") system and an enterprise resource planning ("ERP") system. An SRM system is a system that enables businesses to manage their relationships with their suppliers and vendors, and an SRM's functionality typically includes interaction management, bid management, etc. In many respects, these interactions are similar to those in a CRM system. Examples of an SRM system are SAP Business One® and Oracle SRM®. An ERP system is a system that allows an enterprise to share customer, product, competitor and market information. Examples of an ERP management system are SAP Business One®, Great Plains™, MAS200™, and Netsuite™.

A data management system maintains information in one or more memories. The information maintained by a data management system may consist of "data objects," which as used herein are data elements native to the data management system that may be associated with one or more actions/functions that may be performed on the data element. An example of a data object is a transactional object or a business object, such as a customer, a quotation, an order, a business partner, or an activity. For example, a business partner data object may contain items of information (such as contact information) that relate to a business partner of a company.

For a user of a data management system to obtain information from that data management system, that user typically must have an active session interfacing the user with the data management system. For example, a user may login to the data management system (by providing an account number and password) and may then be presented with a user interface for the data management system. In such a case, a user may interact with the user interface of the data management system and submit a request for information through that user interface. Information may then be provided, again through that user interface, to the user.

Among other things, the present inventors perceived a need in the art to facilitate the retrieval of information from a data management system without the user having an online connection to the data management system and/or accessing a user interface of the data management system. The present inventors also perceived a need in the art for providing updates to information, such as in an offline mode, to a user of the data management system.

BRIEF DESCRIPTION OF DRAWINGS

FIG. 4 is a simplified block diagram that shows further details of an information requestor's front-end system and of a data management system according to embodiments of the present invention.

FIG. 5 is a simplified block diagram that shows details of a sample request for information from a data management system and response to the request according to embodiments of the present invention.

DETAILED DESCRIPTION

Embodiments of the present invention provide mechanisms to obtain information from a data management system. Some embodiments provide a general infrastructure to support the complete process of customising and transfer of the information. In some embodiments, data may be provided independently of the connection status of the end requestor of the information. In such systems, the end requestor does not need to establish a direct session with the data management system to obtain the requested information. Off-line capabilities may be provided so a request may be sent during an offline mode. In some embodiments, a user may subscribe to updates to identified information, for example if an event occurred triggering the update of this information. The event triggering the updates to information may be monitored at the user's (client) computer system or at a backend computer system that hosts the data management system. For example, a user may perform an action in a groupware application that triggers a request for an update of the identified information, in which case a request may be transmitted from the groupware application to the data management system for an update of the identified information. It may be understood that the examples discussed below are for illustration purposes only and are not intended to limit the configuration to that shown.

Figure 1:
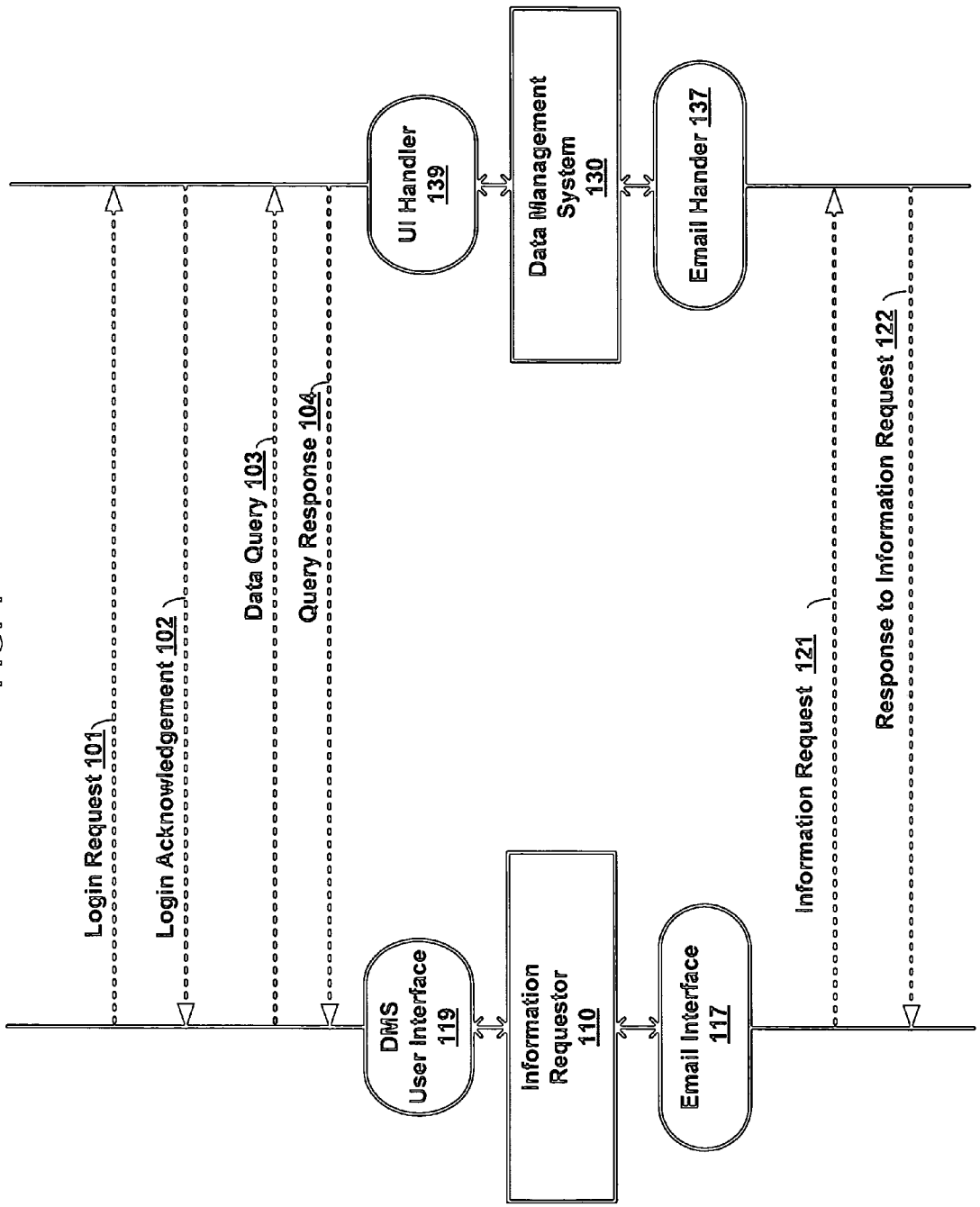
FIG. 1 is a data flow diagram that depicts a process for a requester to obtain information from a data management system according to embodiments of the present invention.

FIG. 1 is a data flow diagram that depicts a process for a requestor to obtain information from a data management system according to an embodiment of the present invention. FIG. 1 shows an information requestor 110 and a data management system 130. Data management system 130 may comprise data management system software that is executing on a first computer system, and information requestor 110 may be a user of a second computer system that is coupled to data management system 130, such as over a network. For example, data management system 130 may be the data management system for a company (e.g., the Akron Heating Company) and may store information on customers of that company. Information requestor 110 may be a sales person who works at that company and who has access to the company data management system. Information requestor 110 may be referred to as operating a front-end system, and data management system 130 may be referred to as a back-end system. As shown in FIG. 1, information requestor 119 may have data management system user interface software 119 that interacts with a user interface handler 139 of data management system 130, which may be software that implements the user interface. In some embodiments, data management system user interface software 119 may be web-browser software, such as Internet Explorer® from Microsoft Corporation. A system's user interface is an interface that handles input and output of information between a system and the user of the system, and may include screens that are standard for the system as well as add-in features, if any, that may be added to the user interface. For example, a user may submit a request through user interface 119 for information about a business partner data object that is stored in data management system 130, in which case the system of information requestor 110 may be acting as a remote terminal for data management system 130.

Information requestor 110 may have an electronic mail (email) interface 117 to send and receive electronic mail, such as over the Internet. As is known, email is the transmission of private messages such as text entered from a keyboard (and/or or an electronic file stored on a disk) over communications networks. Email systems may use a format to communicate with other email systems, such as the Simple Mail Transfer Protocol (SMTP) or some other standard. Email interface 117 may include an email application program, such as Outlook® from Microsoft Corp., GMail® from Google Inc., Eudora® from Qualcomm Inc., etc. Similarly, data management system 130 as shown has an email handler 137, which may be software that allows data management system 130 to send and receive email.

In a typical embodiment, a user of data management system 130 (such as information requestor 110) may perform a login procedure at data management system 130 to interface with data management system 130. Such a login procedure generally requires a user name and password. As shown in FIG. 1, information requestor 110 may transmit a login request 101 from its data management system user interface 119 to data management system 130 and, if access is to be granted, a login acknowledgement may be returned from data management system 130 to the user interface of information requestor 110. Once log-ed in, information requestor 110 may then use data management system user interface 119 to submit a data query 103 to data management system 130. For example, information requestor 110 may request all the information about a particular customer (e.g., all the information about XYZ Travel Inc.) that is stored in data management system 130. To facilitate such a transaction, information requestor 110 should be familiar with the user interface of data management system 130, which may not be completely intuitive. In addition, to submit such a data query, in prior art systems information requestor 110 would generally need an online session with data management system 130, which would typically require requestor 110 to be logged into data management system 130. If the requested data is found, a query response 104 with the requested information would typically be transmitted to information requestor 110's data management system user interface. Again, the receipt of query response 104 would generally occur in prior art systems as part of an online session between information requestor 110 and data management system 130.

According to embodiments of the present invention, information requestor 110 may obtain information from data management system 130 without an online connection being established between information requestor 110 and data management system 130. In the example shown in FIG. 1, information requester 110 may submit an information request 121 from its email interface 117 as an email message, which may be received and processed by email handler 137 of data management system 130. Data management system 130 may analyze the received request, collect relevant information, and transmit a response 122 with the requested information as an email message directed to the email address of information requester 110. In some embodiments, information requester 110 may request information "passively" in that the information requestor 110 is not currently online with the data management system 130 (as shown in FIG. 1), and/or "actively" in that information requestor 110 may be currently online with the data management system and may send the request as part of this online session.

In some examples, the request for information may be sent using a form that may be prepared offline and submitted to request handling software at the front-end system of information requestor 110, which may send the request to data management system 130 as an email message or as a direct communication once the front-end system is online again. A set of forms may be published that may be designed to query the data management system (e.g., to query the associated database of the data management system). The form may specify the information that is needed to make the query. In some embodiments, the user does not need to login to the data management system to make a query, but instead may send a request as an offline communication (such as an email or instant message, etc.).

Figure 2:
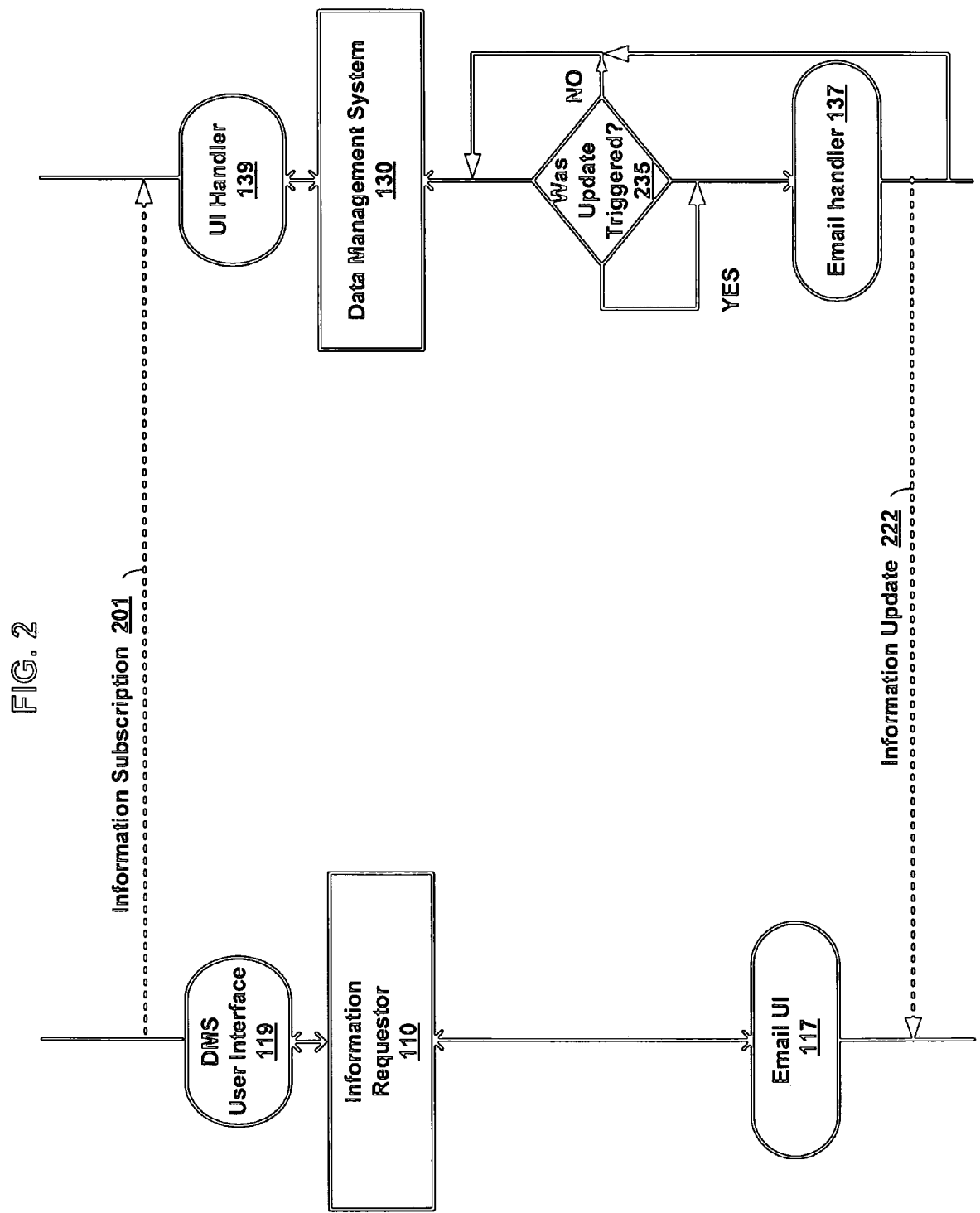
FIG. 2 is a data flow diagram that depicts a process for a requestor to subscribe to updates of information from a data management system according to embodiments of the present invention.

FIG. 2 is a data flow diagram that depicts a process for a requestor to subscribe to updates of information from a data management system according to embodiments of the present invention. Such embodiments provide a general infrastructure to support the complete process of customising, job scheduling, and transfer of the information from a data management system to a requester. In some embodiments, data may be provided independently of the connection status of the end user, and thus the user does not need to access the data management system to obtain the requested information. Information may be requested, via forms and groupware, on a regular basis or on the occurrence of an action.

As in FIG. 1, FIG. 2 shows information requestor 110, with its data management system user interface 119 and email UI 117, and data management system 130, with its user interface handler 139 and email handler 137. As shown in FIG. 2, information requestor 110 may send an information subscription 201 as part of a direct online session through data management system user interface 119 to data management system 130. In other embodiments, information subscription 201 may be submitted to data management system 130 offline, such as in an email message. Information subscription 201 may be a form that requests updates to an identified item of information, such as for example all the information about a particular customer. For example, information requestor 110 may be a sales person who is going on a sales call to visit XYZ Travel Inc. (a customer) and may have previously obtained (e.g., as shown in FIG. 1) the then-available information about XYZ Travel Inc. that is stored in data management system 130. While on route to the sales call, information requestor 110 may wish to be provided with any updates to the information about XYZ Travel Inc. that is maintained in data management system 130. If, for example, payment of a bill was recently received from XYZ Travel Inc. and that payment was just recorded in data management system 130, information requestor 110 may wish to be informed (e.g., by wireless email) of that payment while on route to visit XYZ Travel Inc.

As shown in FIG. 2, data management system 130 may monitor (235), such as part of a loop, to determine if an update to information that is the subject of a subscription has been triggered by the occurrence of an event. A batch job may periodically send updates to subscribed users. In some embodiments, an update may be triggered by the passage of time, and example of such time-controlled updates are those sent every hour, every day, etc. In some other embodiments, an update may be triggered whenever the data object that stores the information is itself updated, thus providing the information requester with the latest known information. If an update was triggered, then in the embodiment shown in FIG. 2, information update 222 with the updated information may be transmitted to information requestor 110 as an email. In some embodiments, information update 222 may include an attached form, such as in the Portable Document Format (pdf) or some other format, that contains the updated information. Such information updates may also be transmitted using other offline methods (such as by facsimile, instant messages, etc.). In some embodiments, the information to be updated, the transmission method for updates, and the timing for providing updates may be customisable by a user.

Figure 3:
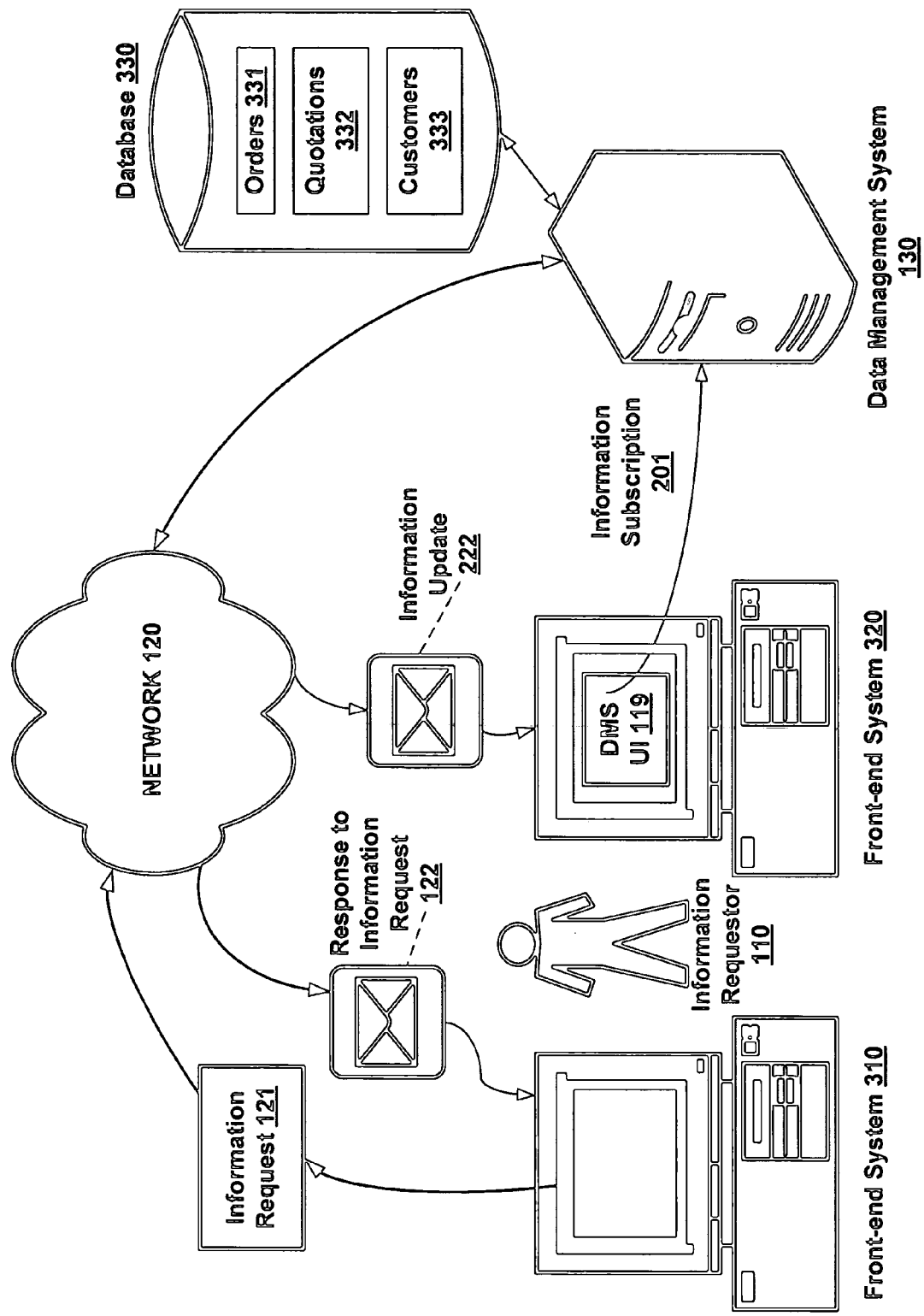
FIG. 3 is a simplified block diagram that shows a system for obtaining information from a data management system according to embodiments of the present invention.

FIG. 3 is a simplified block diagram that shows a system for obtaining information from a data management system according to embodiments of the present invention. FIG. 3 shows information requestor 110, data management system 130, information request 121, response to information request 122, information subscription 201, and information update 222 of FIGS. 1-2. As shown in FIG. 3, information requestor 110 has access to a front-end system 310 and a front-end system 320, both or which are coupled to data management system 130 over a network 120. Front-end systems 310 and 320 may be any type of devices for running application software, such as for example a personal computer, a terminal, a personal digital assistant (PDA), etc. Data management system user interface 119 may be presented on a display screen at front-end system 320, in which case the user may perform operations on data management system 130 as if that user were directly operating on data management system 130.

Network 120 may be any type of network for communicating information, such as a local area network (LAN), wide area network (WAN), the Internet, or an intranet. Data management system 130 may be a terminal server, mainframe computer, or any type of computer system that services users. Typically, many front-end systems may be coupled to back-end system 130. As shown, back-end system 130 is coupled to a database 330, which may be any type of computer readable medium, such as one or more hard disk memories, that stores instructions and data to support a decision making process. Database 330 may contain a plurality of data objects, which are shown for example as orders 331, quotations 332, and customers 333, that are maintained by data management system 130, which may perform functions on these data objects. Data management system 130 may maintain (i.e., perform functions on) these data objects. Front-end systems 310 and 320 and data management system 130 may contain one or more memories and processors, as shown in FIG. 4.

As shown in FIG. 3, information requestor 110 may use front-end system 310 to transmit information request 121 over network 120 to data management system 130. Information request 121 may be transmitted as, for example, a Hyper-text Markup Language (HTML) form, as an email with an attached form, etc. In other embodiments, information request 121 may be submitted to data management system 130 during a direct session with data management system 130. As discussed above, the data management system may transmit response to information request 122 over network 120 to front-end system 310. Response to information request 122 is represented in FIG. 3 as an email message, in which case it may be sent to an email address for information requestor 110, who may then access this email address using an email application program. In FIG. 3, front-end system 320 is shown providing data management user interface 119 which may be used by information requestor 110 to send information subscription 201 to data management system 130. In some embodiments, front-end system 320 may be directly connected to data management system 130, as suggested in FIG. 3. More typically, front-end system 320 is coupled to data management system 130 over a network such as network 120. Front-end system 320 may contain instructions that implement data management system user interface 119. As shown in FIG. 3, front-end system 320 may submit information subscription 201 to data management system 130 during an online session with data management system 130, but in other embodiments the information subscription may be submitted offline, such as by email. When a triggering event occurs, data management system 130 may compile an update message and send information update 222 to information requestor 110. Information update 222 may be sent as an email message, as shown in FIG. 3, or by any other applicable means.

FIG. 4 is a simplified block diagram that shows further details of an information requestor's front-end system and of a data management system according to embodiments of the present invention. In particular, FIG. 4 shows further details of front-end system 310 and of data management system 130. As shown in FIG. 4, front-end system 310 includes a memory 411 and a processor 412, which may be any types of applicable memory or processor devices as discussed above. Memory 411 is shown as storing data management user interface instructions 451, email application instructions 452, request forms 453, and groupware applications 454. Data management system user interface instructions 451 and email application instructions 452 may be software instructions that respectively implement data management system user interface 119 and email interface 117 of FIGS. 1-2. Request forms 453 may be a plurality of forms (such as PDF forms, work processor formatted forms, etc.) that may be used to request information from data management system 130. Groupware applications 454 are software that may be used by a group of users in an organization to perform functions such as email, sharing files, word processing, calendar organization, etc. As shown in FIG. 4, data management system 130 includes a data management server 420, email server 430, and a web server 440. Data management server 420 includes a memory 421 and processor 422, email server 430 includes a memory 431 and processor 432, and web server 440 includes a memory 441 and processor 442, which may be any types of applicable memory or processor devices as discussed above. Data management system server 420 may perform data management system functions, email server 430 may implement email handler 137 of FIGS. 1-2, and a web server 430 may implement Internet access to data management system server 420. Memory 441 of web server 440 may store request forms 446, which may be forms (e.g., in HTML format) for use by a requester in requesting information from data management system 130. Memory 421 of data management system server 420 may contain form parser instructions 225 for execution by processor 422 to extract request details from a request form, and may contain information retrieval instructions 426 for retrieving information from data objects in database 330.

FIG. 5 is a simplified block diagram that shows details of a sample request for information from a data management system and response to the request according to embodiments of the present invention. In particular, FIG. 5 shows information request 121 and response to information request 122, which are discussed above. Information request 121 may be a form (in a format such as PDF, HTML, etc.) that is used to obtain information from a data management system. As shown in FIG. 5, information request 121 contains a plurality of fields 169. Thus, the request form may be a document in a format native to a word processor (e.g., Microsoft Word®), a document in the portable document format ("PDF") such as used by Adobe Acrobat®, etc. A form is a formatted document containing blank fields upon which a user may input data. A requestor may have previously downloaded a request form, for example from the Internet or directly from data management system 130. In this example, information request 121 has fields for the user to include their name ("Ed Q. Jones"), a password to the data management system, and to identify the information requested. As shown in this example, the requestor has selected customer information as the type of information being requested, and has identified the customer about whom the information is requested (here, "XYZ Travel Inc."). Thus, a user that wishes to obtain information from business system 130 may complete one or more of fields 169 on information request form 121 and send the completed form to data management system 130. In the example shown, an employee ("Ed Q. Jones") who wishes to remotely obtain information about customer XYZ Travel Inc. may check the box for customer information and include the name "XYZ Travel Inc." in the appropriate blank. Of course, the format for this form is only an example, and any other formats may be used. Moreover, the requestor may of course select any other types of information that is maintained by the data management system, such as order information, quotation information, activities information, etc., and any other types of information may appear on the form. Information request 121 may contain a form identifier number 170 that the data management system may use to determine that the form is requesting information. Information subscription 201 of FIGS. 2-3 may use a similar format.

As shown in FIG. 5, response to information request 122 also has a plurality of fields. In this example, response to information request 122 may be an email message and may contain a header with information such as the sender address ("From") and destination address ("To") for the email message. Information request 122 is also shown specifying information that was requested such as the customer name and address, internal customer representative, point of contact at customer and phone number, and correspondence history. Of course, any other types of data management system information may also be included. In some embodiments, the requested information is part of a form (e.g., in PDF format) that may be attached to the email message. Information update 222 of FIGS. 2-3 may use a similar format.

Figure 6:
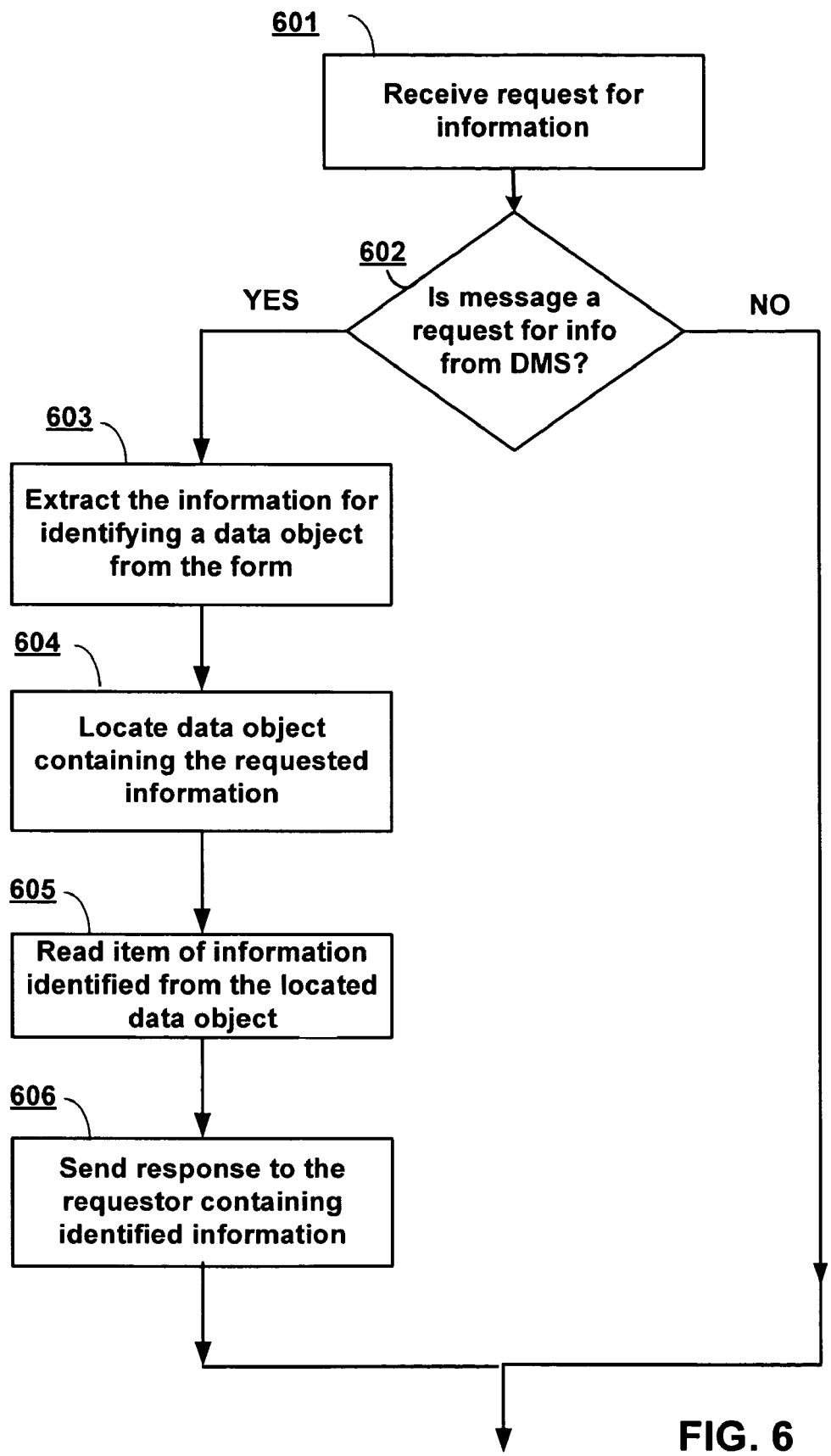
FIG. 6 is a flowchart of a method for obtaining information from a data management system according to an embodiment of the present invention.

FIG. 6 is a flowchart of a method for obtaining information from a data management system according to an embodiment of the present invention. The method shown in FIG. 6 are discussed with reference to the structures shown in FIGS. 1-5, but of course this method may also be practiced with other structures. A request for information from a requestor may be received (601) at a data management system, such as shown by information request 121 in FIG. 1. This request may comprise a form that has identifying information for identifying an item of information requested, such as shown in FIG. 5, and may be sent as an email message. An automatic determination may then be made, from the received request, as to whether the request is requesting information from the data management system (602). If so, the data management system may automatically extract identifying information from the request form (603). For example, form parser instructions 225 may be used by data management system 130 to parse an information request form based on the location of the information on the form or based on tracking codes. The information may indicate that this is a request for information about customer "XYZ Travel Inc." as shown by information request 121 in FIG. 4.

The data management system may, based on the extracted identifying information, locate a data object that contains the requested information (604) and may read the the requested information from the located data object (605). For example, information retrieval instructions 226 of data management system 130 may read a data object for customer "XYZ Travel Inc." from the set of customers data objects 333 on database 330. Data management system 120 may then compiling a response to the request which includes the requested information and may transmit the response to the requester without an online connection being established between the requestor and the data management system. For example, response to information request 121 may be composed and sent from data management system 130 to information requestor 110 as a form in Portable Document Format as an attachment to an email message. In other embodiments, the response may be sent as a facsimile, instant message, etc. In some embodiments, the request form specifies a communication method for the transmission of a response. According to such embodiments, a requestor obtains information from the data management system without establishing an online connection with the data management system.

In some embodiments, a request form may indicate that the requested information should be updated if the corresponding data object is updated by the data management system. In such embodiments, the data management system may determine that a data object containing requested information is being updated at the data management system with updated information. Based on this determination, the data management system may compile an update response that comprises the updated information from the updated data object and may transmit the update response to the requester without an online connection being established between the requestor and the data management system.

In embodiments, a request to provide a user with updates to identified information, such as information subscription 201, may be received at a data management system. Such a request may be received at the data management system as an offline communication or as part of an online communication between the user and the data management system. A determination may be made whether an event has occurred to trigger the update of the identified information. Examples of such an event may be a change in the value of the information in the data management system data object, such as for example if the user data object for customer "XYZ Travel Inc." in database 330 was updated to reflect that the customer has recently paid a bill. Another example of a triggering event is a lapse of a certain time interval, such as for example a timer indicating that is has been a day since the last update. If so, the data management system may locate a data object at the data management system that contains the information to be updated, read the information to be updated from the located data object, and transmit a message comprising the updated information to the user without an online connection being established between the user and the data management system. In some embodiments, the message comprising the updated information is transmitted to the user as a facsimile.

Another example of an event that triggers the update of the identified information may be the user logging on or off from a groupware server, such as one that supports a user of front-end system 310. A request may be made at a groupware application program executing on front-end computer system 320, such as groupware applications 454 executing on a first computer system, requesting a subscription to updates of identified information that is stored in a data object at a data management system. By subscribing to updates, the user may be indicating that an update should be sent if some event occurs. The groupware application may determine that the user has performed an action that triggers a request for an update of the identified information. For example, the user may have triggered such an update by opening a context link to the identified information in the groupware application program. As user herein, a context link refers to an association between text elements within a document and functions related to those text elements, so that a user may access the functions by selecting the text elements. An example of a context link is a Smart Tag available in applications in the Microsoft Office® application suite. Another example of a triggering event is the opening of a contact information record that contains the identified information, such as one of the contact information records maintained by a contact information management program, such as Microsoft Outlook®. If such a triggering action has been performed, the groupware application may transmit a request to the data management system requesting an update of the identified information (such as information request 121), and a response may be received from the data management system comprising an update to the identified information (such as response to information request 122). In some embodiments, the request for an update of the identified information is transmitted to the data management system as an email message, and the response from the data management system with the update to the identified information is received from the data management system as an email message. In some embodiments, the request for an update of the identified information is transmitted as an online communication between the first computer system and the data management system.

The above is a detailed discussion of the certain embodiments. It may be understood that the examples discussed are for illustration purposes only and are not intended to limit the configuration to that shown. It is of course intended that the scope of the claims may cover other embodiments than those described above and their equivalents.

What is claimed is:

1. A method performed on a front-end of a computer system, comprising:
    responsive to receiving a command from a user indicating an action to be performed by a groupware application executed at the front-end of the computer system, identifying, by the groupware application, information that is required for performance of the action, said identified information being stored on a customer relationship management system at a back-end of the computer system and a copy of the identified information being stored on the front-end of the computer system;
    responsive to identifying information, determining at the front-end computer system whether the action triggers a need for an update of the identified information stored on the front-end of the computer system, prior to executing the action and, if not, executing the action, else if so:
    transmitting, by the front-end computer system, a request via an email message to the customer relationship management system located at the back-end of the computer system, requesting an update of a portion of the identified information necessary to complete the action,
    receiving, at the front-end computer system via an email message sent by the back-end of the computer system, the update of the portion of the identified information, wherein the update of the portion of the identified information is retrieved from the customer relationship management system,
    updating the portion of the identified information on the front-end computer system, and
    completing execution of the action using the updated identified information including the updated portion.

2. The method of claim 1, wherein another action that triggers a request for an update comprises opening a context link to the identified information in the groupware application program.

3. The method of claim 1, wherein the request for an update of the identified information is transmitted as an online communication between the front-end computer system and the customer relationship management system.

4. The method of claim 1, wherein the action is not a request to update the identified information.

5. A method for updating customer information on a groupware client with customer information maintained on a groupware server, comprising:
    storing customer information on a groupware server and a copy of the same customer information in memory on a groupware client;
    storing updates to the customer information at a groupware server;
    in response to a user at the groupware client beginning to correspond with a customer having customer information stored on the groupware client, determining by the groupware client whether the correspondence requires updated customer information;
    if the correspondence is determined to require updated customer information, requesting by the groupware client updated customer information from the groupware server via an email message;
    receiving the updated customer information received from the groupware server via an email message; and
    using, by the groupware client, the received updated customer information to complete the correspondence with the customer.

6. The method of claim 5, wherein the correspondence by the groupware client is a facsimile message, and the updated customer information is the customer facsimile number stored at the groupware server.

7. The method of claim 1, wherein the receiving, via an email message, is in response to the transmitted e-mail request.

8. The method of claim 1, wherein the updated identified information for completing execution of the action is provided in the response e-mail message.

9. The method of claim 1, wherein the transmitting is performed by an e-mail interface of the user that is off-line from the groupware application and the customer relationship management system at a back-end of the computer system.

10. The method of claim 5, wherein the received e-mail message is a response e-mail message received at the groupware client that contains the updated customer information.

11. The method of claim 5, wherein the groupware client determines that the correspondence requires updated customer information when a user accesses the customer information and/or the user opens a context link corresponding to the customer information.

12. The method of claim 1, wherein the application program maintains a plurality of contact information records, and the action that triggers a request for an update comprises opening a contact information record that contains the identified information.

13. A method for retrieving data at a front-end client from a database accessible via a back-end computer system, while the front-end client is off-line from the back-end system, comprising:

in response to a selection of an action at the off-line front end client, determining by the off-line front end client that the selected action requires updating information that is stored at the off-line front-end client and in a database accessible via a back-end of a computer system for the action to be performed;

generating an information request at the off-line front-end client, wherein the information request includes a request for updated information required to perform the action;

transmitting, by the off-line front end client, an e-mail message identifying the information required to perform the selected action;

receiving the transmitted e-mail at an e-mail handler at the back-end of the computer system;

analyzing, by a database management system at the back-end computer system, the received e-mail to obtain the identified information from the e-mail message;

using the identified information to retrieve data records related to the identified information, wherein the retrieved data records include an update of the identified information;

generating by the database management system a response e-mail containing the retrieved data records related to the identified information; and transmitting the generated response e-mail to the off-line front end client.

\* \* \* \* \*